(12) United States Patent
Leara et al.

(10) Patent No.: US 11,762,414 B2
(45) Date of Patent: Sep. 19, 2023

(54) METHODS FOR PREVENTING PCIE MISCONFIGURATIONS

(71) Applicant: Dell Products L.P., Round Rock, TX (US)

(72) Inventors: William D. Leara, Round Rock, TX (US); Terry L. Matula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 17/667,925

(22) Filed: Feb. 9, 2022

(65) Prior Publication Data

US 2023/0251684 A1    Aug. 10, 2023

(51) Int. Cl.
*G06F 1/12* (2006.01)
*G06F 13/42* (2006.01)
*G06F 9/451* (2018.01)

(52) U.S. Cl.
CPC .............. *G06F 1/12* (2013.01); *G06F 9/451* (2018.02); *G06F 13/4221* (2013.01)

(58) Field of Classification Search
CPC ......... G06F 13/4221; G06F 9/451; G06F 1/12
See application file for complete search history.

(56) References Cited

U.S. PATENT DOCUMENTS

| | | | |
|---|---|---|---|
| 6,572,384 B1* | 6/2003 | Marchevsky | G06F 13/409 439/43 |
| 2012/0047308 A1* | 2/2012 | Feng | G06F 13/4059 710/311 |
| 2019/0042349 A1* | 2/2019 | Sawal | G06F 11/0781 |
| 2019/0286602 A1* | 9/2019 | Remis | G06F 13/4081 |
| 2019/0294563 A1* | 9/2019 | Remis | G06F 11/3031 |

* cited by examiner

*Primary Examiner* — Nimesh G Patel
(74) *Attorney, Agent, or Firm* — Womble Bond Dickinson (US) LLP

(57) ABSTRACT

Methods and systems for managing the operation of data processing systems are disclosed. A data processing system may provide computer implemented services. The computer implemented services may be provided with various components operably connected to one another. The data processing system may proactively identify and attempt to remediate mismatches between communication rates of the components and the operable connections between the components. The mismatches may be identified based on electrical widths and clock speeds supported by the operable connections and components.

20 Claims, 10 Drawing Sheets

METHODS FOR PREVENTING PCIE MISCONFIGURATIONS

FIELD OF THE EMBODIMENTS

Embodiments disclosed herein relate generally to device management. More particularly, embodiments disclosed herein relate to systems and methods to manage startup processes.

BACKGROUND

Computing devices may store data and use stored data. For example, computing devices may utilize data when providing computer implemented services. The computing device may also use computing resources to provide the computer implemented services.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1:
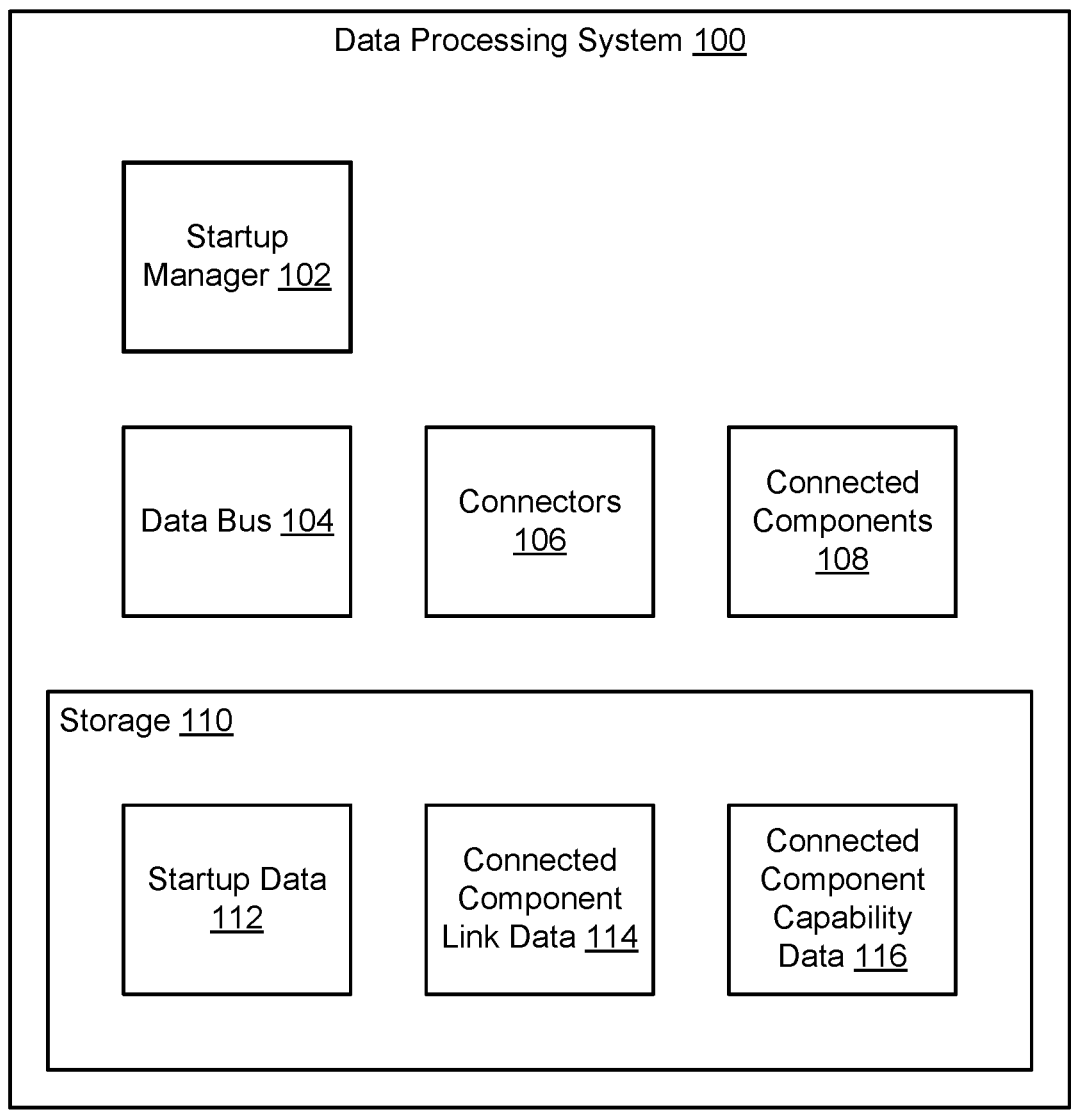
FIG. 1 shows a block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing the operation of data processing system. A data processing system may include a computing device that may provide computer implemented services. Computing resources provided by components of the data processing system may be utilized to provide the computer implemented services.

The components of the data processing system may be operably connected to one another to facilitate transmission of data. The rate at which data may be transmitted between different components may limit the operation of the components.

For example, some components may be capable of performing various actions at a high rate, but may need access to data from other components to perform the actions. If the components are unable to access the data from other components at a corresponding rate, then the operation of the components may be limited by the communication rate rather than inherent limitations of the components themselves.

Some of the components of a data processing system may be operably connected via one or more connectors. However, the communication rate supported by these connectors may vary while having a similar appearance (which may not indicate the varied supported communication rates). If a component is connected via a connector that supports a lower communication rate than that supported by the connected component, then the connected component may not be able to provide its full level of performance. However, if the component is moved to a connector that supports a corresponding communication rate, then the full level of performance may be provided by the connected component.

To improve the likelihood that connected components provide their full level of performance, a data processing system in accordance with embodiments disclosed herein may perform startup processes that attempt to identify and proactively remediate mismatches between the communication rates supported by connectors and connected components. By doing so, connected components may be more likely to be able to provide expected levels of performance (e.g., by not being limited by communicate rates).

In an embodiment, a computer-implemented method for managing operation of a data processing system is provided. The method may include identifying, by a startup manager of the data processing system, a connected component populated in a connector of the data processing system, the connected component being electrically connected to a processor (e.g., directly or indirectly via a chipset) of the data processing system via the connector, and the connector being of a type that does not visually indicate an electrical width and clock speed of electrical connections to the processor that may be established with the connector; obtaining, by the startup manager, an electrical width or a clock speed of the electrical connection between the processor and the connected component; obtaining, by the startup manager, a maximum electrical width or a maximum clock speed supported by the connected component; making a determination that the electrical width is mismatched with the maximum electrical width and/or the clock speed is mismatched with the maximum clock speed; and based on the determination, performing an action set to attempt to reduce a mismatch between the electrical width and/or the maximum electrical width or the clock speed and the maximum clock speed.

The action set may include generating a graphical user interface comprising at least one element indicating that a mismatch is present; displaying the graphical user interface during a startup of the data processing system; and generating a startup log entry indicating that the connected component is electrically mismatched with the connector.

The graphical user interface may include an input field usable to receive user input, input received via the input field may selectively disable the display of the graphical user interface during the startup and/or subsequently performed startups of the data processing system.

The electrical width or clock speed may be obtained from a register populated during a startup of the data processing system, and the register being populated with information regarding a negotiated connection between the connected component and the processor via the connector.

The connector may include a mechanical interface that supports attachment of connected components having different electrical widths from that of the connector.

The electrical width of the connector may be based on a number of independent electrical paths (e.g., transmission lines) of a data bus between the processor and the connector.

The connector may be a Peripheral Component Interconnect Express (PCIe) connector that visually appears to support a larger number of independent electrical paths of the data bus between the processor and the connector than are actually supported.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating data processing system 100 in accordance with an embodiment is shown. Data processing system 100 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

Data processing system 100 may provide any quantity and type of computer implemented services. The computer implemented services may include, for example, database services, instant messaging services, video conferencing services, and/or any other types of services that may be provided by data processing systems. Providing these services may consume computing resources provided by components of data processing system 100.

To provide these services, data processing system 100 may host applications (not shown) that provide the computer implemented services. The applications (or other types of executing entities) may presume (and/or may require for proper operation of the applications) that a data processing system hosting the application is operating in a predetermined manner. The predetermined manner of operation may include, for example, executing an operating system, drivers, or other type of management entities that mediate, facilitate, or otherwise operate in a manner which enables the applications to operate (e.g., by providing abstracted access to hardware resources used in the execution of the applications).

To enter the predetermined manner of operation, data processing system 100 may include startup manager 102. Startup manager 102 may perform one or more operations to enter the predetermined manner of operation. These operations may include, for example, a boot process from a power-on (or reset or other manner of operation that differs from the predetermined manner of operation to the extent that the applications may not be able to operate) to hand off operation of the data processing system to an operating system or other type of operational management entity that places data processing system 100 into the predetermined manner of operation. The operating system may, for example, provide abstracted access to resources (e.g., processing resources provided by processors, memory resource provided by memory modules, storage resources provided by storage devices, etc.) utilized by the applications hosted by the host device.

For example, consider a scenario where a data processing system has been shut off. After the data processing system is turned on, the data processing system may be operating in a startup manner such that the data processing system is not yet able to support execution of an application (e.g., the application may not be able to successfully execute until the data processing system hosts an operating system). To enter the predetermined manner of operation conducive to execution of the application, the data processing system may go through a startup process which may be performed by a type of management entity (e.g., startup manager 102) such as a basic input-output system and/or other startup management entities. The management entity may perform any number of actions (e.g., a "startup process") to prepare data processing system 100 to begin execution of an operating system or other type of management entity that facilitates execution of applications (and/or operation of certain types of hardware devices such as application specific integrated circuits that may provide certain functions without need for a software layer).

These actions may include, for example, inventorying the hardware components hosted by a data processing system, loading drivers or other software components, configuring hardware and/or software components, etc. As part of the startup process, the management entity may also load code, configuration settings, and/or other data corresponding to an operating system (and/or other management entity types and/or other types of executing entities) to memory. The data may be stored in persistent storage thereby allowing it to be read into memory.

Once the data is loaded into memory, the data processing system may initiate execution of code (e.g., computer instructions) included in the data in memory to begin operation of the operating system. The executing code may utilize configuration settings and/or other information also included in the data in memory.

Once the data processing system hosts the operating system and/or performs other types of predetermined operations, discussed above, then the applications may begin to provide the computer implemented services using access to computing resources managed by the operating system. These computing resources may include, for example, processing resources (e.g., provided by processors), memory resources (e.g., provided by memory modules), storage resources (e.g., provided by storage devices), communications resources (e.g., provided by communications devices), and/or other types of resources provided by any number and type of device. The rate at which computer implemented services may be provided may be limited by the availability of computing resources.

The devices that provide these computing resources may be interconnected by various communication buses (e.g., as "connected components"). Data processing system 100 may include one or more data buses 104, one or more connectors 106, and one or more connected components 108 (e.g., devices that may contribute computing resources used to provide computer implemented services).

For example, data processing system 100 may implement the Peripheral Component Interconnect Express (PCIe) standard where connected components 108 are physically connected to connectors 106 and operably connected to processors and/or other components via data bus 104.

Data bus 104 may be implemented with various electrical components such as communication devices (e.g., chips), transmission lines (e.g., circuit card traces interconnecting the chips and the connectors 106), and/or other components. Depending on its implementation, data bus 104 may support different communication rates.

For example, the transmission lines may be implemented with different numbers of independent electrical connections (e.g., electrical widths) which may increase (e.g., larger electrical width) or decrease (e.g., smaller electrical width) parallelization of communications over a bus. Likewise, the chips may support different communication speeds (e.g., clock rates). Thus, the rate at which data may be transferred between connected components 108 and other components (e.g., processors, memory modules, etc.) via data bus 104 may depend on how data bus 104 is implemented to electrically connect it to connectors 106.

Further, the implementation of data bus 104 with respect to the connectors 106 may differ. For example, some of connectors 106 may be physically connected with larger or smaller numbers of transmission lines, some of connectors 106 may be physically connected with higher or lower speed communication chips, etc. Thus, the maximum communication rate to connected components 108 connected via different connectors 106 may be different.

Similarly, connected components 108 may support different communication rates. For example, some of connected components 108 may be capable of supporting communications via larger or smaller electrical widths and/or via larger or smaller communication rates (e.g., clock rates of communication). Consequently, if a connected component is operably connected via a connector that supports a higher or lower communication rate than is supported by the connected component, then there may be a mismatch in communication capabilities. The mismatch may result in the connected component communicating at a lower rate than at which it may be able to communicate if operably connected via a connector that matches its communication rate. The reduced communication rate may limit the computing resources contributed by the connected component.

In general, embodiments disclosed herein relate to methods and systems for providing computer implemented services using computing resources. To provide the computer implemented services, data processing system 100 may proactively identify communication limitations between components that may impact the quantity of computing resources available for providing computer implemented services.

If a mismatch between supported communication rates of a connected component and a data bus servicing communications between the connected component and other components is identified, then data processing system 100 may take action to attempt to remediate the mismatch. By remediating mismatch, the rate at which computing resources contributed by the connected component may be improved.

Figure 2:
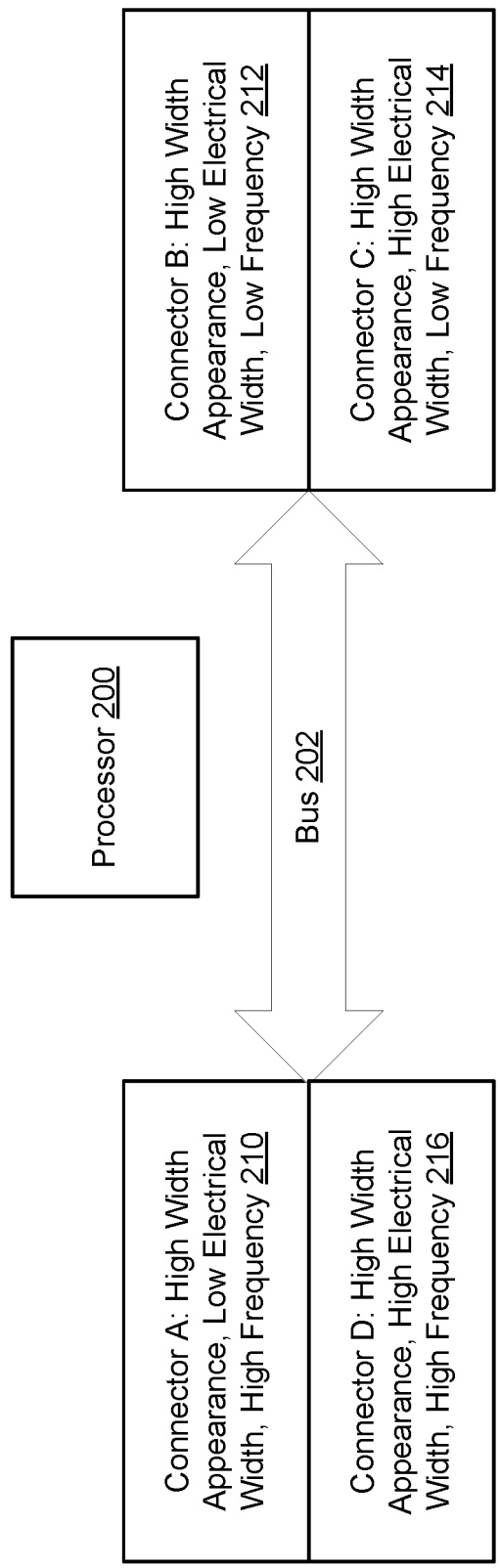
FIG. 2 shows a block diagram illustrating a communication topology in accordance with an embodiment.

For example, any of connectors 106 may support physical connection of connected components of varying supported communication rates. However, connectors 106 may not visually indicate the communication rates supported by data bus 104 via the respective connectors. Consequently, if a high communication rate connected component is connected via a connector which is only able to support lower speed communication rates, then the connected component may be unable to provide all of its computing resources. However, if the connected component is disconnected from the connector and connected to a second connector that supports the high communication rate, then the connected component may provide all of its computing resources (or, at least may not be limited by communications between the connected component and other components). Refer to FIG. 2 for additional details regarding communication rate mismatches.

To provide the above noted functionality, startup manager 102 may provide startup management services that may proactively identify and attempt to remediate communication rate mismatches. To do so, startup manager 102 may (i) initiate a startup (e.g., a process which may include any number of actions which may be specified by startup data 112), (ii) during the startup, obtain an electrical width and clock speed (e.g., "actual communication characteristics") to a connected component and a maximum electrical width and maximum clock speed (e.g., "supported communication characteristics") supported by the connected component, (iii) determine whether a mismatch is present using the obtained actual communication characteristics and the supported communication characteristics, and (iv) when mismatches are present, perform an action set to reduce the mismatch. The aforementioned process may be repeated for any number of connected components.

To obtain the actual communication characteristics and the supported communication characteristics, startup manager 102 may read registers or other data structures populated by the normal startup process. The registers may include these characteristics. For example, the startup process may generally include a process of establishing communications between the connectors and connected components, which may set the electrical width and clock speed for the connected components. The registers may also include the maximum electrical width and the maximum clock speed supported by the connected components. The actual communication characteristics and the supported communication characteristics may be obtained via other methods without departing from embodiments disclosed herein. The actual communication characteristics and the supported communication characteristics may be stored as connected component link data 114 and connected component capability data 116, respectively.

The action set may include any number and type of actions including, for example, (i) displaying warnings and/or other types of messages to users based on the mismatches, (ii) writing information to a log (e.g., a startup log) regarding mismatches, (iii) pausing startup processes until a user or operably connected device that indicates that the startup process should continue, (iv) obtaining input from a user or operably connected device indicating that an identified mismatch should be ignored in the future, and (v) for mismatches that have been previous indicated (e.g., by users or other devices) to be ignored, continuing the startup without pausing or otherwise interrupting the startup process.

By doing so, communication mismatches that may otherwise limit computer implemented services may be reduced thereby allowing for improved computer implemented services to be provided.

In an embodiment, startup manager 102 is implemented using a hardware device including circuitry. The hardware device may be, for example, a digital signal processor, a field programmable gate array, or an application specific integrated circuit. The circuitry may be adapted to cause the hardware device to perform the functionality of startup manager 102. Startup manager 102 may be implemented using other types of hardware devices without departing embodiment disclosed herein.

In one embodiment, startup manager 102 is implemented using a processor adapted to execute computing code stored on a persistent storage that when executed by the processor performs the functionality of startup manager 102 discussed throughout this application. The processor may be a hardware processor including circuitry such as, for example, a central processing unit, a processing core, or a microcontroller. The processor may be other types of hardware devices for processing information without departing embodiment disclosed herein.

Figure 3A:
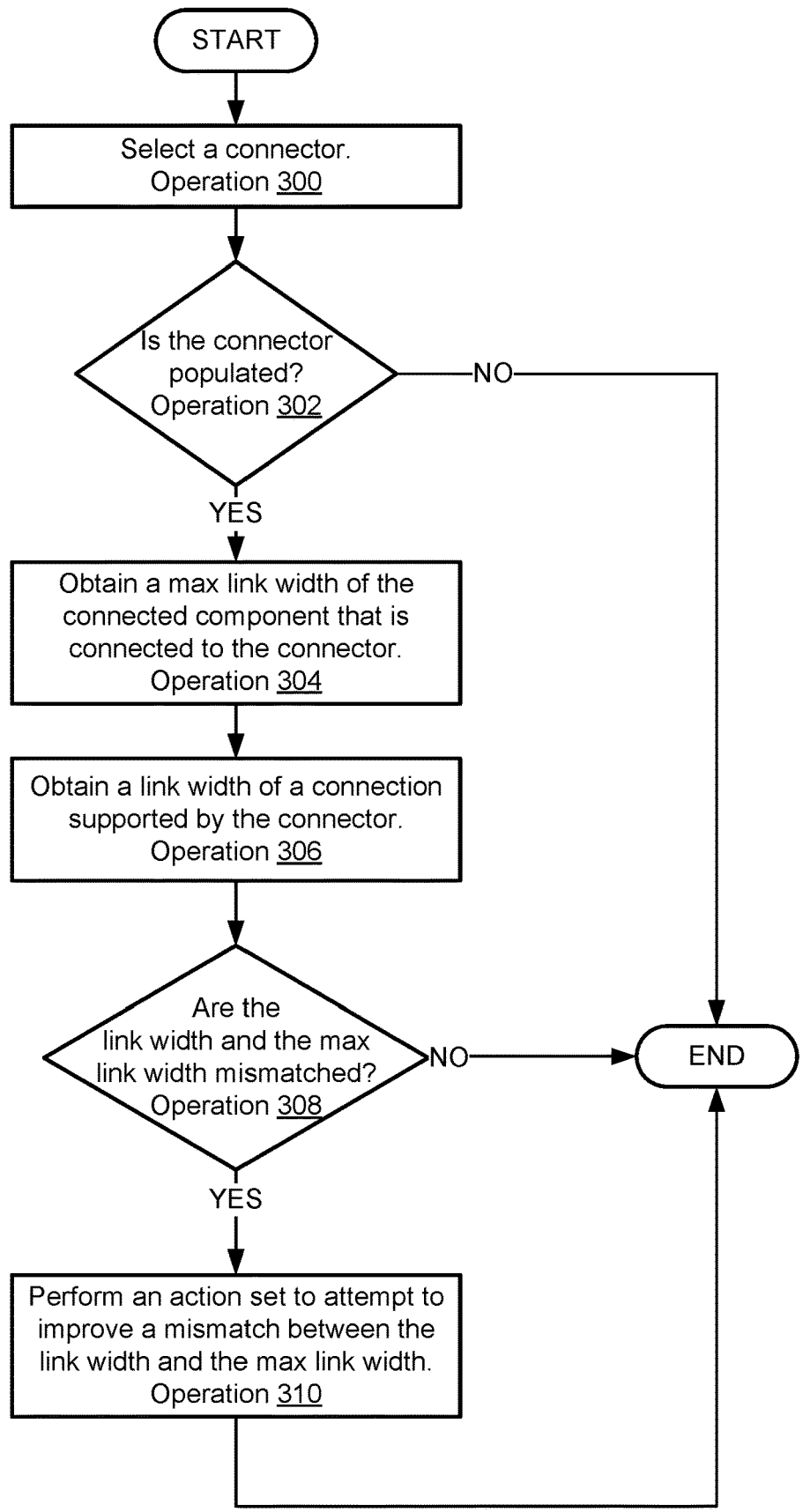
FIG. 3A shows a flow diagram illustrating a method of performing a startup of a data processing system in accordance with an embodiment.
Figure 3B:
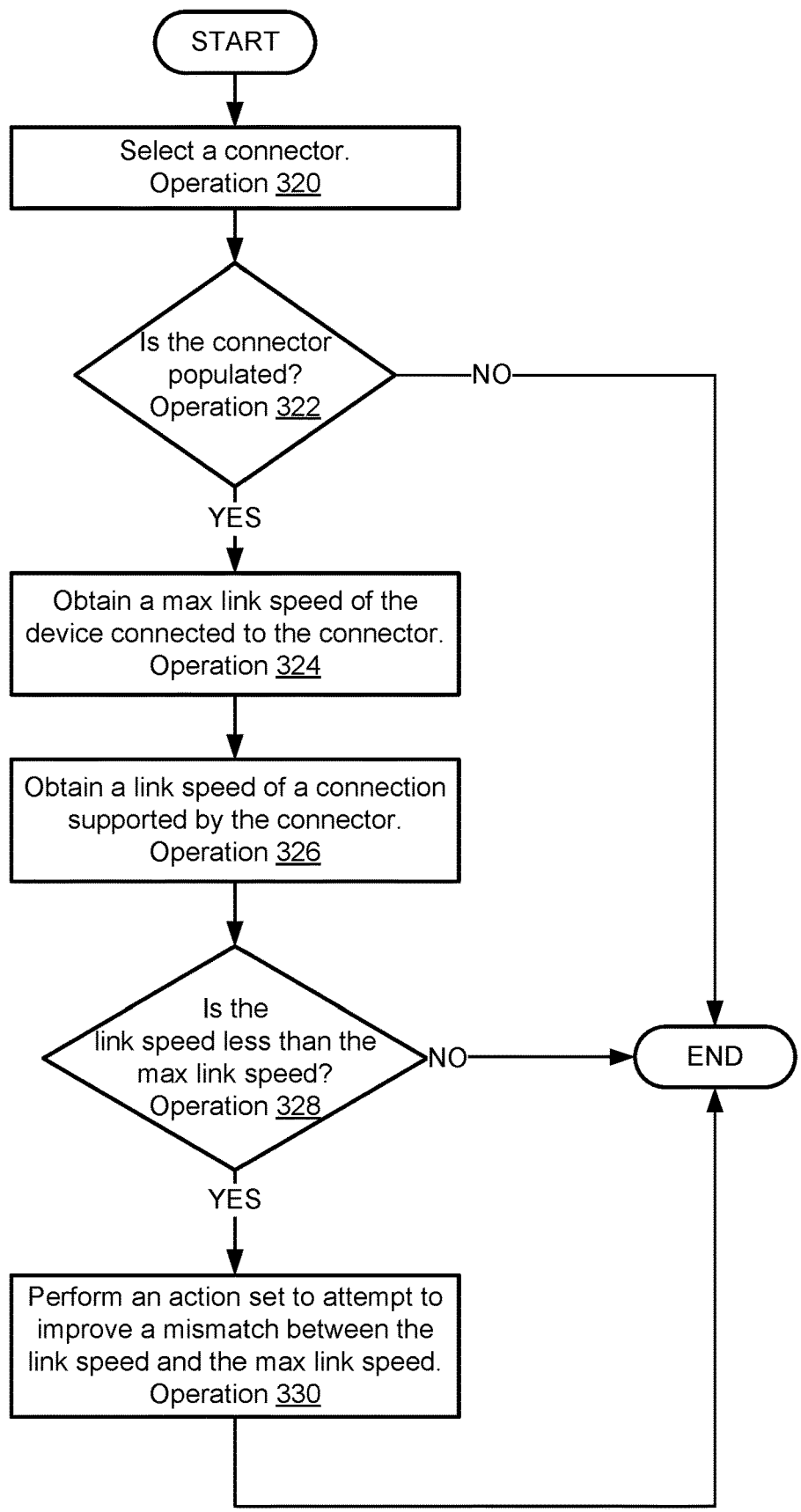
FIG. 3B shows a flow diagram illustrating a method of performing a startup of a data processing system in accordance with an embodiment.

In an embodiment, startup manager 102 performs all, or a portion, of the methods illustrated in FIGS. 3A-3B.

In an embodiment, storage 110 is implemented using physical devices that provide data storage services (e.g., storing data and providing copies of previously stored data). The devices that provide data storage services may include hardware devices and/or logical devices. For example, storage 110 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 110 may include a memory device (e.g., a dual in line memory device) in which data is stored and from which copies of previously stored data are provided. In another example, storage 110 may include a persistent storage device (e.g., a solid-state disk drive) in which data is stored and from which copies of previously stored data is provided. In a still further example, storage 110 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 110 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 110 may store data structures including startup data 112, connected component link data 114, and/or connected component capability data 116. Startup manager 102 may manage these data structures.

While various data structures have been illustrated and described in FIG. 1 with specific structures, any of the data structures may be implemented with various structures (e.g., lists, tables, linked lists, databases, etc.), stored in different locations, and/or spanned across any number of devices without departing from embodiments disclosed herein.

While illustrated in FIG. 1 with a limited number of specific components, a data processing system may include additional, fewer, and/or different components without departing from embodiments disclosed herein.

Turning to FIG. 2, a diagram showing a communication topology in accordance with an embodiment is shown. As noted above, different connectors may be electrically connected using various implementations which may impact the communication rate between components such as processor 200 and connected devices.

For example, consider the diagram of FIG. 2 where processor 200 is connected to four connectors 210-216 via bus 202. Bus 202 may support different communication rates to the respective connectors.

For example, connector A 210 may be electrically connected by a low electrical width (e.g., fewer transmission lines) to processor 200, but the transmission lines may connect to communication chips that support a high clock frequency. In contrast, connector B 212 may be electrically connected by a low electrical width (e.g., fewer transmission lines) to processor 200, and the transmission lines may connect to communication chips that support a low clock frequency. However, both connectors 210, 212 may physically appear similar. Consequently, a user may inadvertently connect a connected device via connector B 212 while it may be better communication rate matched with connector A 210.

Other connectors may also support different communication rates. For example, connector C may be electrically connected by a high electrical width (e.g., more transmission lines) to processor 200, and the transmission lines may connect to communication chips that support a low clock frequency. Thus, connector C 214 may also not support the highest communication rate, but may appear similar to the other connectors.

In contrast, connector D 216 may be electrically connected by a high electrical width (e.g., more transmission lines) to processor 200, and the transmission lines may connect to communication chips that support a high clock frequency. Accordingly, connector D 216 may support the highest communication rate.

When a user is presented with the decision of where to connect a connected device, the user may, consequently, create a mismatch between the supported maximum communication rate of the connected device and the supported maximum communication rate of the connector. Consequently, the connected device may be limited in its ability to contribute computing resources by its connectivity rather than by its inherent hardware limitations.

However, as discussed above, embodiments disclosed herein may facilitate proactive remediation of these mismatches. For example, a data processing system in accordance with embodiments disclosed herein may automatically identify such mismatches and may guide a user in remediating these mismatches. Consequently, the connected device may not be limited in its ability to contribute computing resources by its connectivity rather than its inherent hardware limitations.

As discussed above, the components of FIG. 1 may perform various methods to increase the likelihood of data processing systems being able to provide desired computer implemented services by reducing communication rate mismatches. FIGS. 3A-3B illustrate examples of methods that may be performed by the components of FIG. 1. In the diagrams discussed below and shown in these figures, any of the operations may be repeated, performed in different orders, and/or performed in parallel with or a partially overlapping in time manner with other operations.

Turning to FIG. 3A, a flow diagram illustrating a method of performing a startup of a data processing system in accordance with an embodiment is shown. The method may be performed, for example, by a data processing system.

Prior to operation 300, a startup may be initiated. The startup may include performing a power on self-test and/or other actions that result in a hardware inventory of the data processing system being completed. The hardware inventory may result in communication rate information for connected devices and the connections that serve the connected devices being obtained. For example, a communication rate negotiation process may be performed.

At operation 300, a connector is selected. A connected device may be connected to the connector. The connected device may be serviced by an operable connection supported by the connector. The connector may be a PCIe connector. A communication rate mismatch with respect to the connected device may exist.

At operation 302, it is determined whether the connector is populated (e.g., with a connected component). The determination may be made by reading information from registers populated via early portions of the startup. The registers may include information regarding actual communication characteristics and supported communication characteristics. The read information may indicate whether the connector is populated.

If it is determined that the connector is populated, then the method may proceed to operation 304. Otherwise, the method may end following operation 302.

At operation 304, a max link width of the connected component connected to the connector is obtained. The max link width may indicate a level of communication parallelization (e.g., a number of transmission lines) supported by the connected component. The max link width may be obtained by reading it from a register populated during an earlier portion of the startup.

The max link width may be obtained via other methods. For example, the max link width may be read from the connected component (e.g., via the operable connection supported by the connector), or may be obtained from other sources without departing from embodiments disclosed herein.

At operation 306, a link width of a connection (e.g., an operable connection) supported by the connector is obtained. The link width may indicate a level of communication parallelization (e.g., a number of transmission lines) between the connected component and other components with the connection (e.g., via the connection). The link width may be obtained by reading it from a register populated during an earlier portion of the startup.

At operation 308, it is determined whether there is a mismatch between the link width and the max link width. The determination may be made by comparing the link width and the max link width. For example, if the max link width is larger (or larger by a minimum amount) than the link width, then the connection may limit the connected component. In contrast, if the max link width is the same size or smaller than the link width, then the connection may not limit the connected component. A connected component that is limited by the connection may indicate that there is a mismatch between the link width and the max link width, and a corresponding determination may be made based on the indication.

If it is determined that there is a mismatch between the link width and the max link width, then the method may proceed to operation 310. Otherwise, the method may end following operation 308.

At operation 310, an action set to attempt to improve the mismatch between the link width and the max link width may be performed. The action set may include, for example, (i) logging the mismatch, (ii) displaying a warning and/or other type of message, (iii) requiring that a user acknowledge the warning and/or other type of message between continuing the startup, and/or (iv) performing other actions to notify the user of the mismatch so that the user may elect to take action (e.g., move the connected component to another connector that may support higher communication rates) to eliminate the mismatch and/or otherwise be made aware of the mismatch.

In an embodiment, the user may elect to have future instances of identified mismatches be ignored. Consequently, during subsequent startups, these elected mismatches may be ignored during the startup process. For example, when a warning message for a mismatch is displayed, the user may provide input that allows the mismatch to be ignored in the future. During subsequent startups, if the yes path following operation 308 is followed, no actions may be performed as part of the action set that may impede the startup process. However, non-disruptive action such as warning logging, warning displays, etc. may still be performed.

The method may end following operation 310.

The method illustrated in FIG. 3A may be repeated any number of times until all of the connectors of a data processing system have been selected. These processes may be performed, for example, in a parallel, sequential, and/or partially overlapping in time manner.

Turning to FIG. 3B, a flow diagram illustrating a method of performing a startup of a data processing system in accordance with an embodiment is shown. The method may be performed, for example, by a data processing system. The method of FIG. 3B may be similar to that shown in FIG. 3A. However, rather than attempting to identify mismatches based on electrical widths, the method illustrated in FIG. 3B may attempt to identify communication rate mismatches based on clock rates.

Prior to operation 320, a startup may be initiated. The startup may include performing a power on self-test and/or other actions that result in a hardware inventory of the data processing system being completed. The hardware inventory may result in communication rate information for connected devices and the connections that serve the connected devices being obtained. For example, a communication rate negotiation process may be performed.

At operation 320, a connector is selected. A connected device may be connected to the connector. The connected device may be serviced by an operable connection supported by the connector. The connector may be a PCIe connector. A communication rate mismatch with respect to the connected device may exist.

At operation 322, it is determined whether the connector is populated (e.g., with a connected component). The determination may be made by reading information from registers populated via early portions of the startup. The registers may include information regarding actual communication characteristics and supported communication characteristics. The read information may indicate whether the connector is populated.

If it is determined that the connector is populated, then the method may proceed to operation 304. Otherwise, the method may end following operation 302.

At operation 324, a max link speed (e.g., based on a clock rate) of the connected component connected to the connector is obtained. The max link speed may indicate a rate at which data may be communicated by the connected component over each transmission line connected to it (e.g., via a connector). The max link speed may be obtained by reading it from a register populated during an earlier portion of the startup.

The max link speed may be obtained via other methods. For example, the max link speed may be read from the connected component (e.g., via the operable connection supported by the connector), or may be obtained from other sources without departing from embodiments disclosed herein.

At operation 326, a link speed of a connection (e.g., a clock rate) supported by the connector (e.g., supported by a bus connected to the connector) is obtained. The link speed may indicate a rate at which data may be communicated over each transmission line connected to a connected component (e.g., via a connector). The link speed may be obtained by reading it from a register populated during an earlier portion of the startup.

At operation 328, it is determined whether there is a mismatch between the link speed and the max link speed. The determination may be made by comparing the link speed and the max link speed. For example, if the max link speed is larger (or larger by a minimum amount) than the link speed, then the connection may limit the connected component. In contrast, if the max link speed is the same size or smaller than the link speed, then the connection may not limit the connected component. A connected component that is limited by the connection may indicate that there is a mismatch between the link speed and the max link speed, and a corresponding determination may be made based on the indication.

If it is determined that there is a mismatch between the link speed and the max link speed, then the method may proceed to operation 330. Otherwise, the method may end following operation 328.

At operation 310, an action set to attempt to improve the mismatch between the link speed and the max link speed may be performed. The action set may include, for example, (i) logging the mismatch, (ii) displaying a warning and/or other type of message, (iii) requiring that a user acknowledge the warning and/or other type of message between continuing the startup, and/or (iv) performing other actions to notify the user of the mismatch so that the user may elect to take action (e.g., move the connected component to another connector that may support higher communication rates) to eliminate the mismatch and/or otherwise be made aware of the mismatch.

In an embodiment, the user may elect to have future instances of identified mismatches be ignored. Consequently, during subsequent startups, these elected mismatches may be ignored during the startup process. For example, when a warning message for a mismatch is displayed, the user may provide input that allows the mismatch to be ignored in the future. During subsequent startups, if the yes path following operation 308 is followed, no actions may be performed as part of the action set that may impede the startup process. However, non-disruptive action such as warning logging, warning displays, etc. may still be performed.

The method may end following operation 330.

The method illustrated in FIG. 3B may be repeated any number of times until all of the connectors of a data processing system have been selected. These processes may be performed, for example, in a parallel, sequential, and/or partially overlapping in time manner.

To further clarify embodiments disclosed herein, a process of managing a startup in accordance with embodiments is illustrated in FIGS. 4A-4E. In FIGS. 4A-4E, diagrams illustrating components of a system similar to FIG. 1 are illustrated, along with actions and interactions between various components. In the figures, an edge view of circuit card 402 is presented. Circuit card 402 may be a motherboard of a data processing system and may facilitate interconnection of connected component 410 and processor 400.

Circuit card 402 may be implemented with three connectors 404-408 that may each facilitate operable connection of connected component 410 to processor 400. However, only first connector 404 may be a match for a communication rate supported by connected component 410. In contrast, second connector 406 and third connector 408 may be limited in communication rate. For example, second connector 406 may be operably connected to processor 400 by a portion of a bus that has a smaller electrical width than connected component 410. Similarly, third connector 408 may be operably connected to processor 400 by a portion of the bus that has a smaller clock rate than connected component 410. Consequently, connecting connected component 410 to processor 400 via second connector 406 or third connector 408 may limit its performance. A user unaware of these limitations may conclude, for example, that connected component 410 does not perform well or that the actual performance is less than expected by the user. Either scenario may result in an undesirable outcome for the user.

Figure 4A:
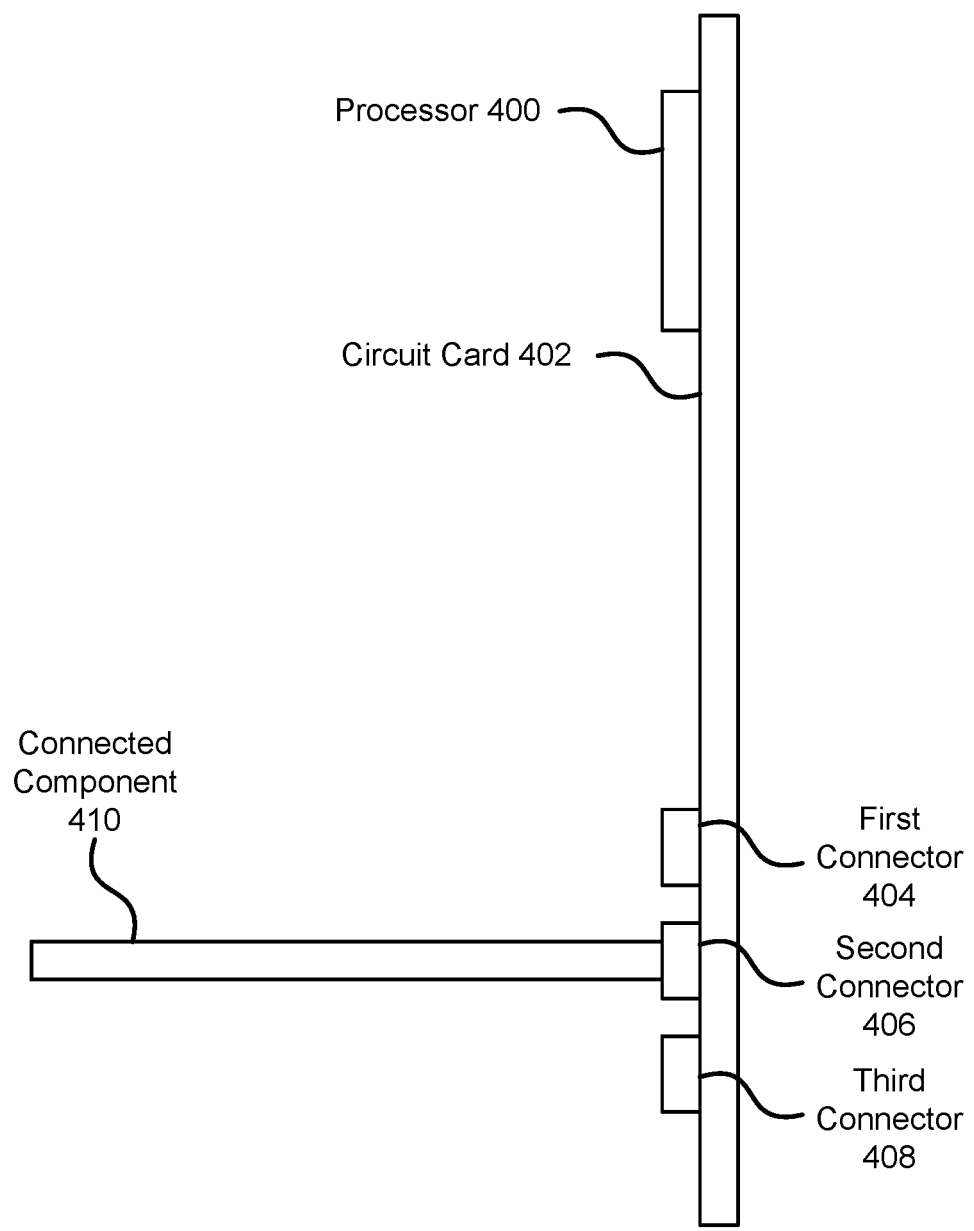
FIGS. 4A-4E show diagrams of a system over time in accordance with an embodiment.

Now, consider a scenario in FIG. 4A where a user, unaware of the communication rate limitations of the connectors 404-408, initially connects connected component 410 to second connector 406. Connected component 410 may be, for example, a graphical processing unit implemented on a PCIe compatible card. Consequently, connected component 410 may be capable of physically connecting to any of connectors 404-408. In this situation, the user's decision may be arbitrary or due to some factor other than the communication rates supported by connectors 404-408 because the communication rates may not be identifiable by the connectors themselves.

After connecting connected component 410, a startup may be performed. As part of the startup, the methods illustrated in FIGS. 3A-3B may be performed. In this case, the performance of the method shown in FIG. 3A results in an action set being performed because there is a link width mismatch between connected component 410 and second connector 406.

Figure 4B:
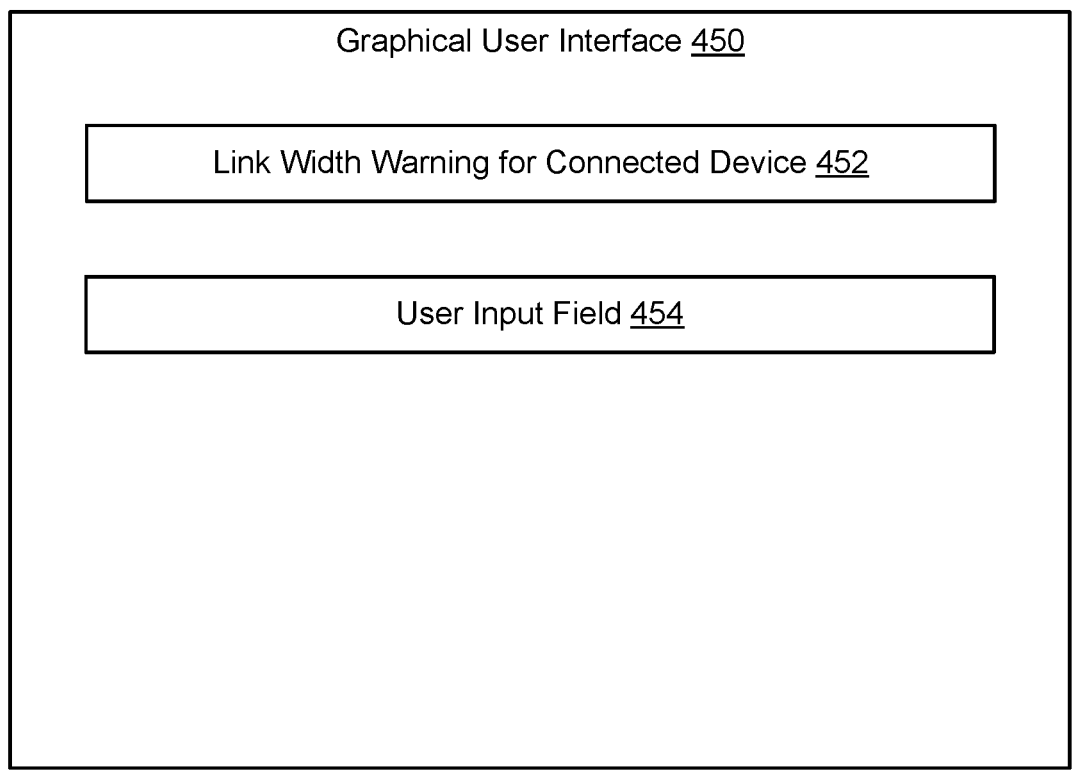

As part of the action set, a graphical user interface is generated and displayed to a user. Turning to FIG. 4B, a diagram of graphical user interface 450 in accordance with an embodiment is shown. Graphical user interface 450 may be displayed as part of the startup. Graphical user interface may include link width warning for connected device 452 and user input field 454.

Link width warning for connected device 452, when displayed to a user, may indicate to the user that connected component 410 is being limited by the connector in which it is positioned. For example, link width warning for connected device 452 may indicate that the bus supporting communications between processor 400 and connected component 410 does not include sufficient transmission lines to meet that maximum number of transmission lines supported by connected component 410.

User input field 454 may allow a user to provide input regarding the warning. For example, user input field 454 may allow the user to acknowledge the warning and/or indicate that the mismatch is to be ignored during subsequent startups.

Figure 4C:
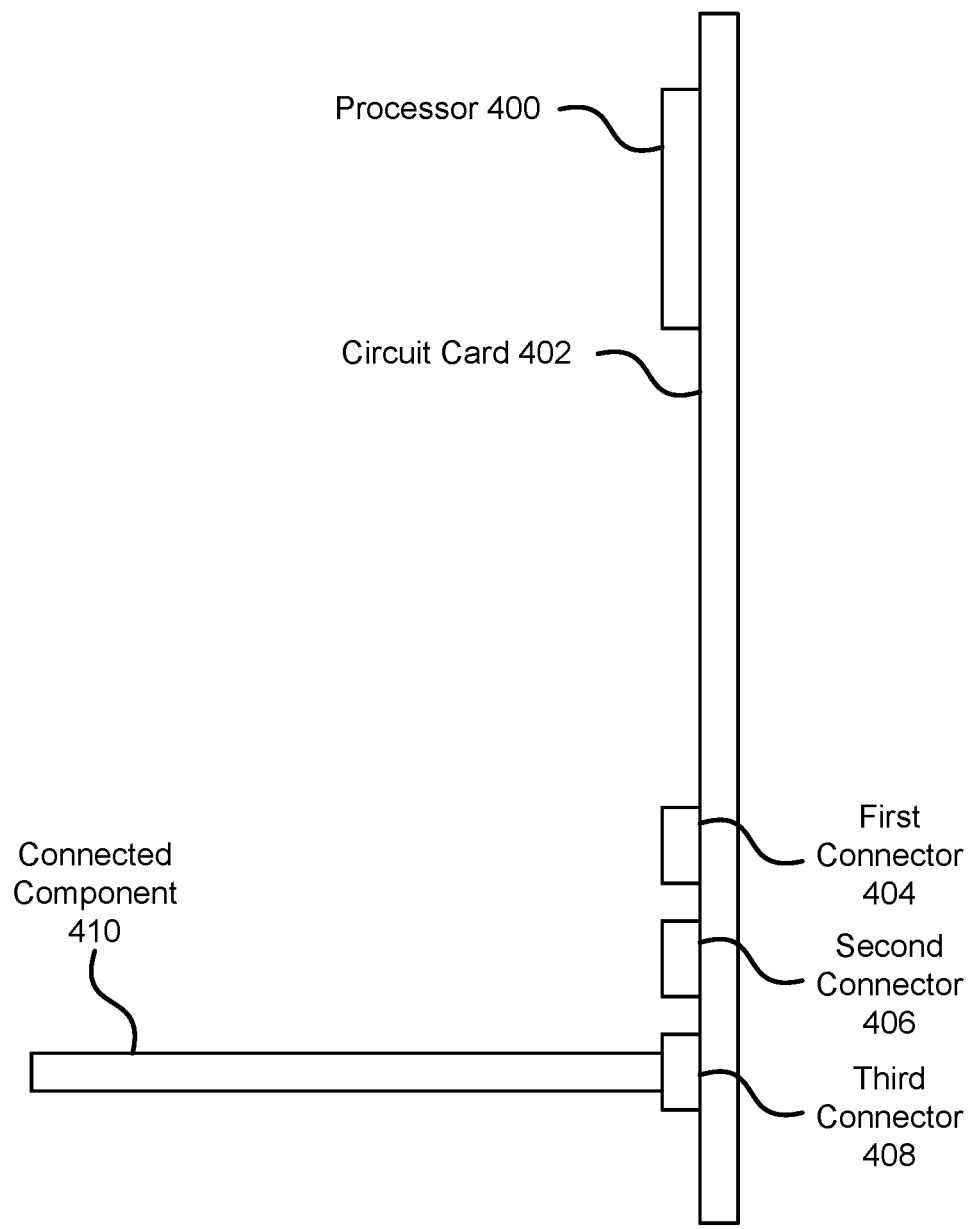

Based on graphical user interface 450 as seen in FIG. 4B, a user may be prompted to move connected component 410. Turning to FIG. 4C, the user may move connected component to third connector 408. However, like second connector 406, third connector 408 may also be limited in its communication rate as discussed above. Consequently, when another startup is performed after connected component 410 is connected to third connector 408, the performance of the method shown in FIG. 3B results in an action set being performed because there is a link speed (e.g., clock rate) mismatch between connected component 410 and third connector 408.

Figure 4D:
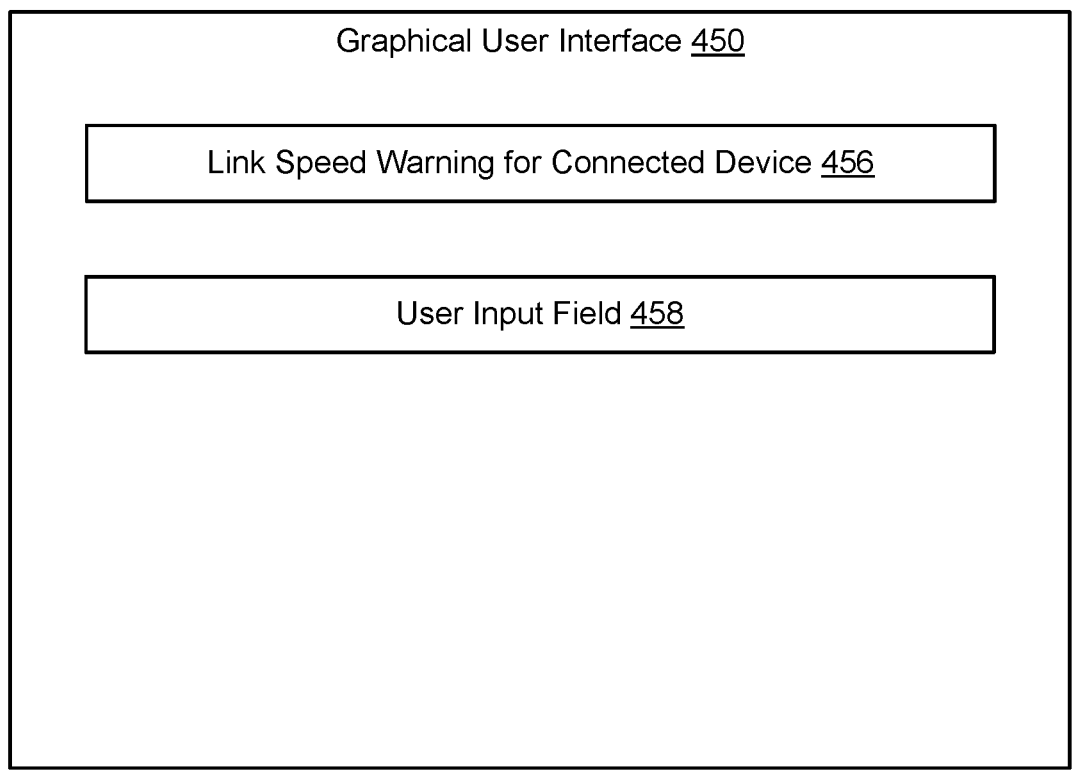

As part of the action set, a graphical user interface is generated and displayed to a user. Turning to FIG. 4D, a diagram of graphical user interface 450 in accordance with an embodiment is shown. Graphical user interface 450 may be displayed as part of the startup. Graphical user interface 450 may include link width warning for connected device 456 and user input field 458.

Link speed warning for connected device 456, when displayed to a user, may indicate to the user that connected component 410 is being limited by the connector in which it is positioned. For example, link speed warning for connected device 456 may indicate that the bus supporting communications between processor 400 and connected component 410 does not support a clock speed at a rate similar to that supported by connected component 410.

User input field 458 may allow a user to provide input regarding the warning. For example, user input field 458 may allow the user to acknowledge the warning and/or indicate that the mismatch is to be ignored during subsequent startups.

Figure 4E:
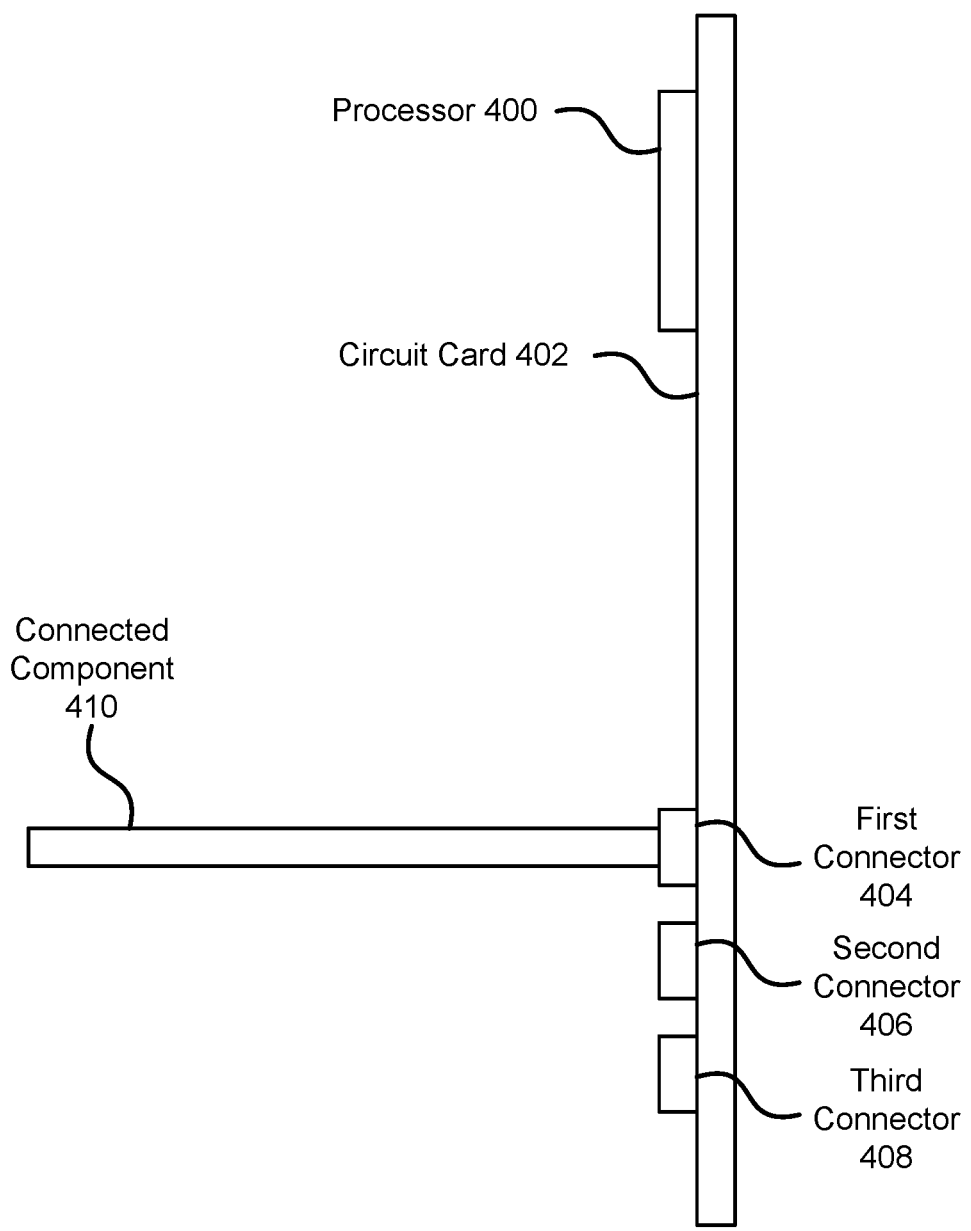

Based on graphical user interface 450 as seen in FIG. 4D, a user may be prompted to move connected component 410. Turning to FIG. 4E, the user may move connected component to first connector 404. However, unlike second connector 406 and third connector 408, first connector 404 may match the communication rate supported by connected component 410, as discussed above. Consequently, when another startup is performed after connected component 410 is connected to first connector 404, the performance of the methods shown in FIGS. 3A and 3B does not result in an action set being performed because there are not communication rate mismatches.

Thus, as illustrated in FIGS. 4A-4E, embodiments disclosed herein may facilitate startups of data processing systems that may be more likely to result in connected components not being limited by communication rates rather than inherent limitations of the connected components. Accordingly, the performance of connected components may be more likely to meet the expectations of user of the connected components.

Figure 5:
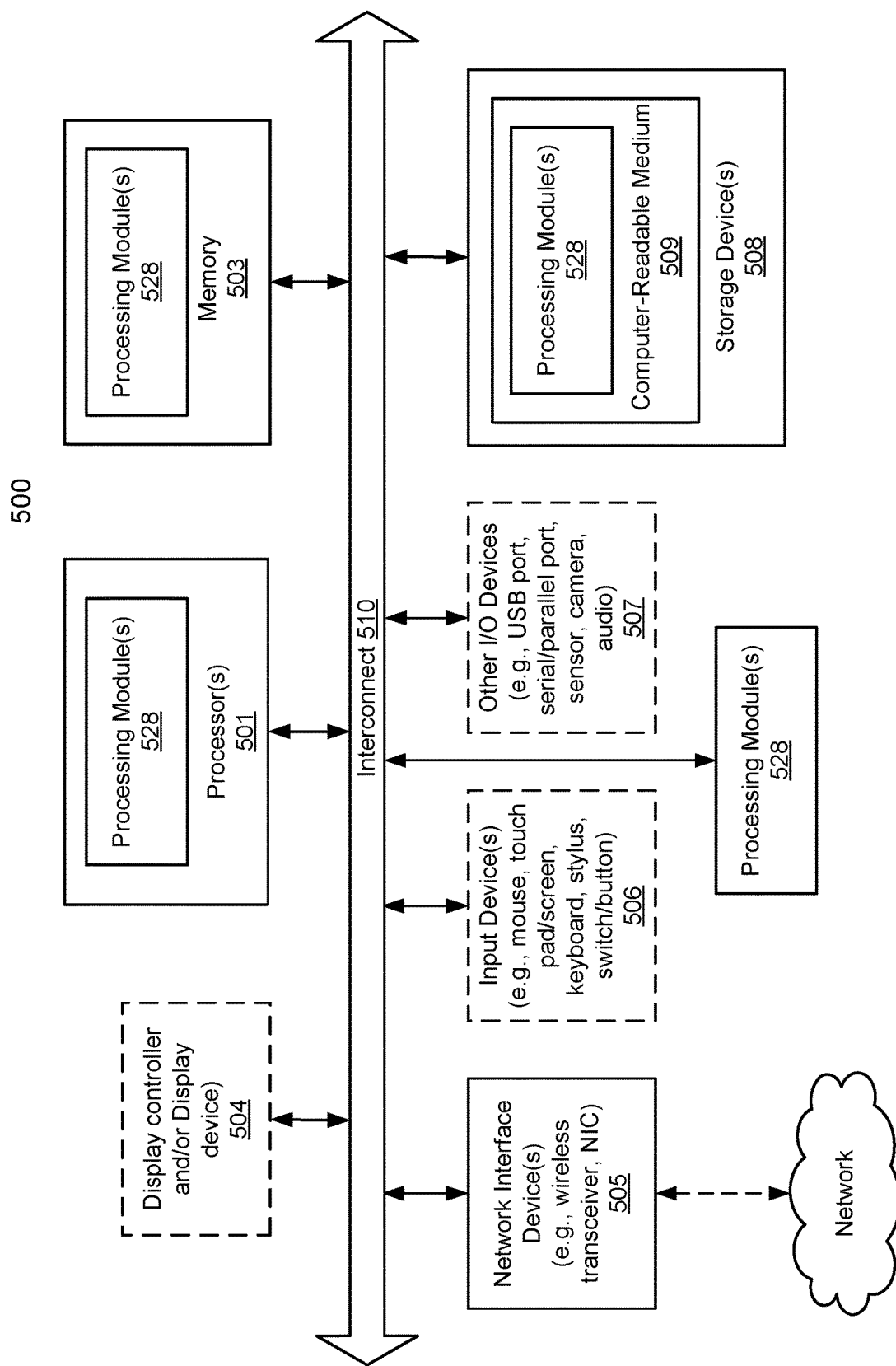
FIG. 5 shows a block diagram illustrating a computing device in accordance with an embodiment.

As discussed above, a data processing system may be implemented with one or more computing devices. Turning to FIG. 5, a block diagram illustrating an example of a computing device in accordance with an embodiment is shown. For example, system 500 may represent any of the data processing systems and/or computing devices described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for managing operation of a data processing system, the method comprising:
    identifying, by a startup manager of the data processing system, a connected component populated in a connector of the data processing system, the connected component being electrically connected to a processor of the data processing system via the connector, and the connector being of a type that does not visually indicate an electrical width and clock speed of electrical connections to the processor that may be established with the connector;
    obtaining, by the startup manager, an electrical width or a clock speed of the electrical connection between the processor and the connected component;
    obtaining, by the startup manager, a maximum electrical width or a maximum clock speed supported by the connected component;
    making a determination that the electrical width is mismatched with the maximum electrical width and/or the clock speed is mismatched with the maximum clock speed;
    based on the determination, performing an action set to attempt to reduce a mismatch between the electrical width and/or the maximum electrical width or the clock speed and the maximum clock speed.

2. The computer-implemented method of claim 1, wherein the action set comprises:
    generating a graphical user interface comprising at least one element indicating that a mismatch is present;
    displaying the graphical user interface during a startup of the data processing system; and
    generating a startup log entry indicating that the connected component is electrically mismatched with the connector.

3. The computer-implemented method of claim 2, wherein the graphical user interface further comprises:
    an input field usable to receive user input,
    wherein input received via the input field selectively disabling the display of the graphical user interface during the startup and/or subsequently performed startups of the data processing system.

4. The computer-implemented method of claim 1, wherein the electrical width or clock speed are obtained from a register populated during a startup of the data processing system, and the register being populated with information regarding a negotiated connection between the connected component and the processor via the connector.

5. The computer-implemented method of claim 1, wherein the connector comprises a mechanical interface that supports attachment of connected components having different electrical widths from that of the connector.

6. The computer-implemented method of claim 5, wherein the electrical width of the connector is based on a number of independent electrical paths of a data bus between the processor and the connector.

7. The computer-implemented method of claim 6, wherein the connector is a Peripheral Component Interconnect Express connector that visually appears to support a larger number of independent electrical paths of the data bus between the processor and the connector than are actually supported.

8. A non-transitory machine-readable medium having instructions stored therein, which when executed by a processor, cause a data processing system to perform operations, the operations comprising:
    identifying, by a startup manager of the data processing system, a connected component populated in a connector of the data processing system, the connected component being electrically connected to a processor of the data processing system via the connector, and the connector being of a type that does not visually indicate an electrical width and clock speed of electrical connections to the processor that may be established with the connector;
    obtaining, by the startup manager, an electrical width or a clock speed of the electrical connection between the processor and the connected component;
    obtaining, by the startup manager, a maximum electrical width or a maximum clock speed supported by the connected component;
    making a determination that the electrical width is mismatched with the maximum electrical width and/or the clock speed is mismatched with the maximum clock speed;
    based on the determination, performing an action set to attempt to reduce a mismatch between the electrical width and/or the maximum electrical width or the clock speed and the maximum clock speed.

9. The non-transitory machine-readable medium of claim 8, wherein the action set comprises:
    generating a graphical user interface comprising at least one element indicating that a mismatch is present;
    displaying the graphical user interface during a startup of the data processing system; and
    generating a startup log entry indicating that the connected component is electrically mismatched with the connector.

10. The non-transitory machine-readable medium of claim 9, wherein the graphical user interface further comprises:
    an input field usable to receive user input,
    wherein input received via the input field selectively disabling the display of the graphical user interface during the startup and/or subsequently performed startups of the data processing system.

11. The non-transitory machine-readable medium of claim 8, wherein the electrical width or clock speed are obtained from a register populated during a startup of the data processing system, and the register being populated with information regarding a negotiated connection between the connected component and the processor via the connector.

12. The non-transitory machine-readable medium of claim 8, wherein the connector comprises a mechanical interface that supports attachment of connected components having different electrical widths from that of the connector.

13. The non-transitory machine-readable medium of claim 12, wherein the electrical width of the connector is based on a number of independent electrical paths of a data bus between the processor and the connector.

14. The non-transitory machine-readable medium of claim 13, wherein the connector is a Peripheral Component Interconnect Express connector that visually appears to support a larger number of independent electrical paths of the data bus between the processor and the connector than are actually supported.

15. A data processing system, comprising:
a connector operably connector to a processor;
the processor being adapted to execute an application configured to:
identify a connected component populated in a connector of the data processing system, the connected component being electrically connected to a processor of the data processing system via the connector, and the connector being of a type that does not visually indicate an electrical width and clock speed of electrical connections to the processor that may be established with the connector;
obtain an electrical width or a clock speed of the electrical connection between the processor and the connected component;
obtain a maximum electrical width or a maximum clock speed supported by the connected component;
make a determination that the electrical width is mismatched with the maximum electrical width and/or the clock speed is mismatched with the maximum clock speed;
based on the determination, perform an action set to attempt to reduce a mismatch between the electrical width and/or the maximum electrical width or the clock speed and the maximum clock speed.

16. The data processing system of claim 15, wherein the action set comprises:
generating a graphical user interface comprising at least one element indicating that a mismatch is present;
displaying the graphical user interface during a startup of the data processing system; and
generating a startup log entry indicating that the connected component is electrically mismatched with the connector.

17. The data processing system of claim 16, wherein the graphical user interface further comprises:
an input field usable to receive user input,
wherein input received via the input field selectively disabling the display of the graphical user interface during the startup and/or subsequently performed startups of the data processing system.

18. The data processing system of claim 15, wherein the electrical width or clock speed are obtained from a register populated during a startup of the data processing system, and the register being populated with information regarding a negotiated connection between the connected component and the processor via the connector.

19. The data processing system of claim 15, wherein the connector comprises a mechanical interface that supports attachment of connected components having different electrical widths from that of the connector.

20. The data processing system of claim 19, wherein the electrical width of the connector is based on a number of independent electrical paths of a data bus between the processor and the connector.

* * * * *